United States Patent [19]

Harris et al.

[11] 4,255,620

[45] Mar. 10, 1981

[54] METHOD AND APPARATUS FOR BANDWIDTH REDUCTION

[75] Inventors: Richard W. Harris, Lodi; John F. Cleveland, Stockton; Thomas M. Lott, San Mateo, all of Calif.

[73] Assignee: VBC, Inc., San Mateo, Calif.

[21] Appl. No.: 868,004

[22] Filed: Jan. 9, 1978

[51] Int. Cl.³ .............................................. H04B 1/66
[52] U.S. Cl. ............................ 179/15.55 R; 370/118; 333/17 R
[58] Field of Search ................. 179/15.55 R, 15 BW, 179/15 FS; 333/17 R; 370/57, 79, 118

[56] References Cited

U.S. PATENT DOCUMENTS

| | | | |
|---|---|---|---|
| 1,836,824 | 12/1931 | Steinberg | 179/15.55 R |
| 1,841,142 | 1/1931 | Mathes | 179/15.55 R |
| 1,948,973 | 2/1934 | Steinberg | 179/15.55 R |
| 3,069,506 | 12/1962 | Hopner et al. | 179/15.55 R |
| 3,914,554 | 10/1975 | Seidel | 179/15 BW |

*Primary Examiner*—Charles E. Atkinson
*Assistant Examiner*—E. S. Kemeny
*Attorney, Agent, or Firm*—Townsend and Townsend

[57] ABSTRACT

The bandwidth of human speech signals, 125 to 3000 Hz, is reduced to approximately 125 to 1500 Hz by folding or shifting the high-frequency consonant-band portion, 1000 to 3000 Hz, into the low-frequency vowel-band portion, 125 to 1000 Hz. After transmission, the reduced speech signal is expanded to reconstruct an approximation of the original speech signal. One embodiment features folding (modulator carrier frequency is 3000 Hz) and modulator feedthrough. Another embodiment features shifting (carrier is 1800 Hz) and no modulator feedthrough. Both embodiments boost lower vowel frequencies prior to modulation, and use no switching circuitry.

42 Claims, 27 Drawing Figures

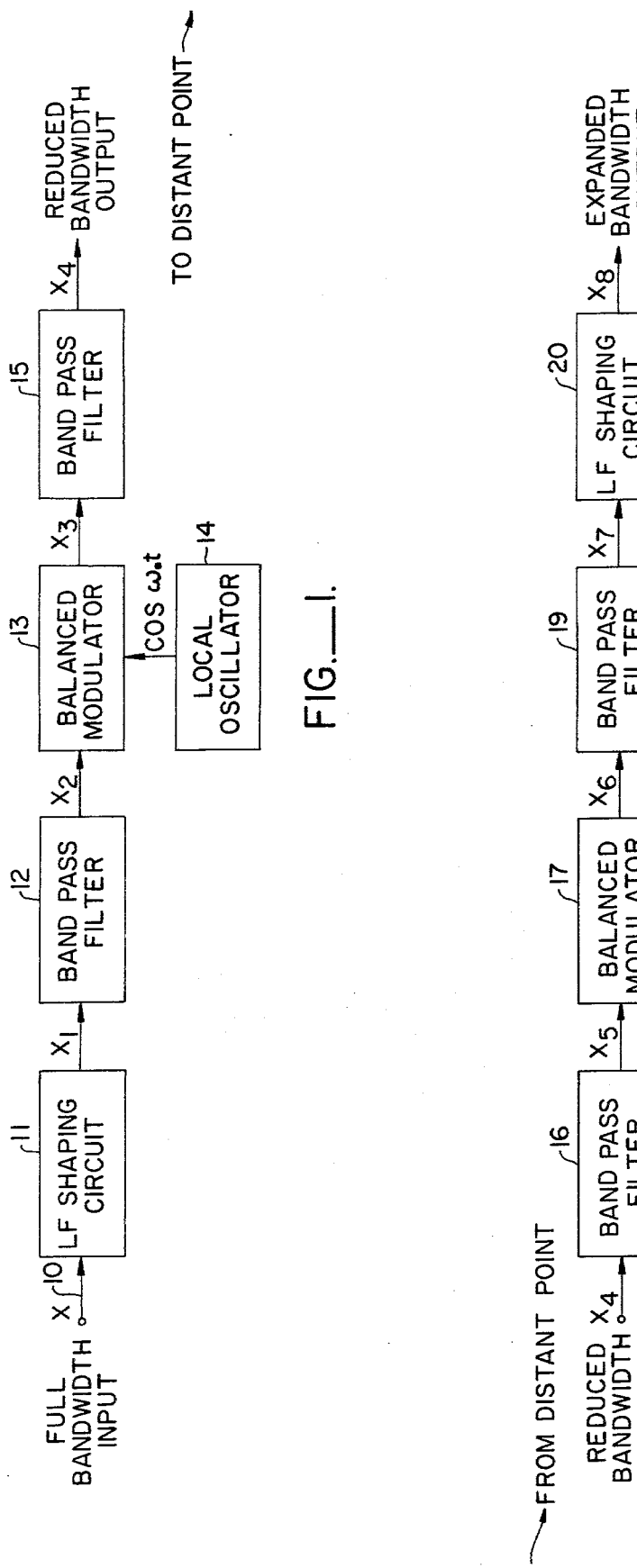
FIG._1.
FIG._2.

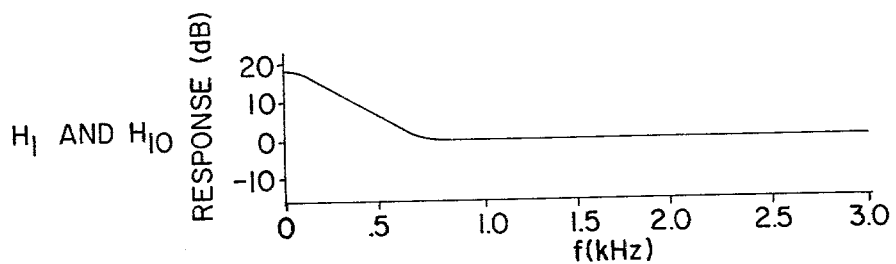
FIG._3A.
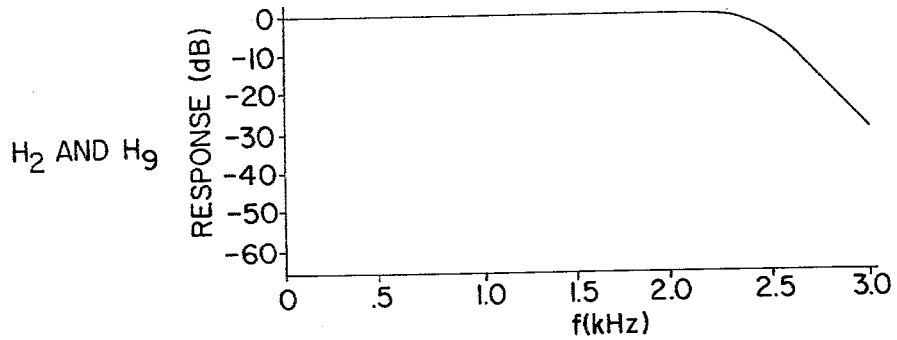
FIG._3B.
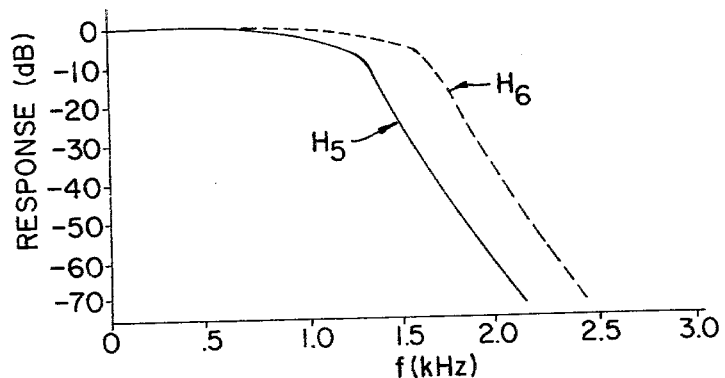
FIG._3C.
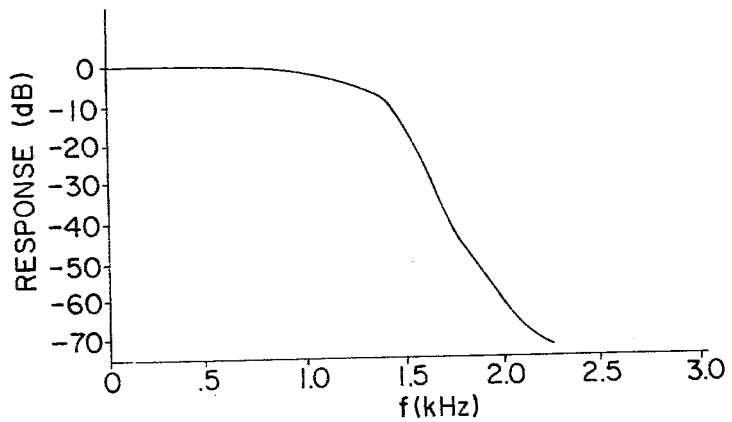
FIG._6.

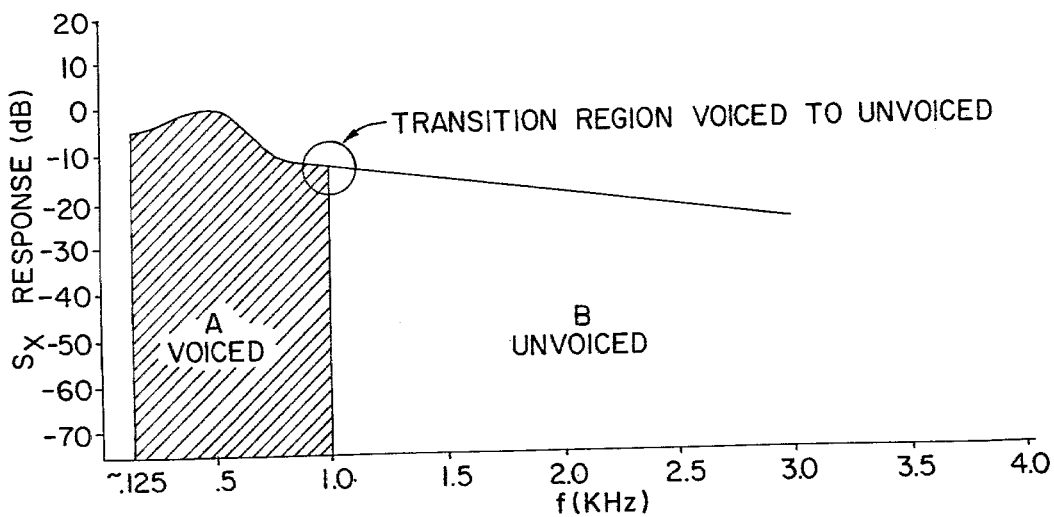
FIG.—4A. MEASURED AMPLITUDE SPEECH SPECTRUM
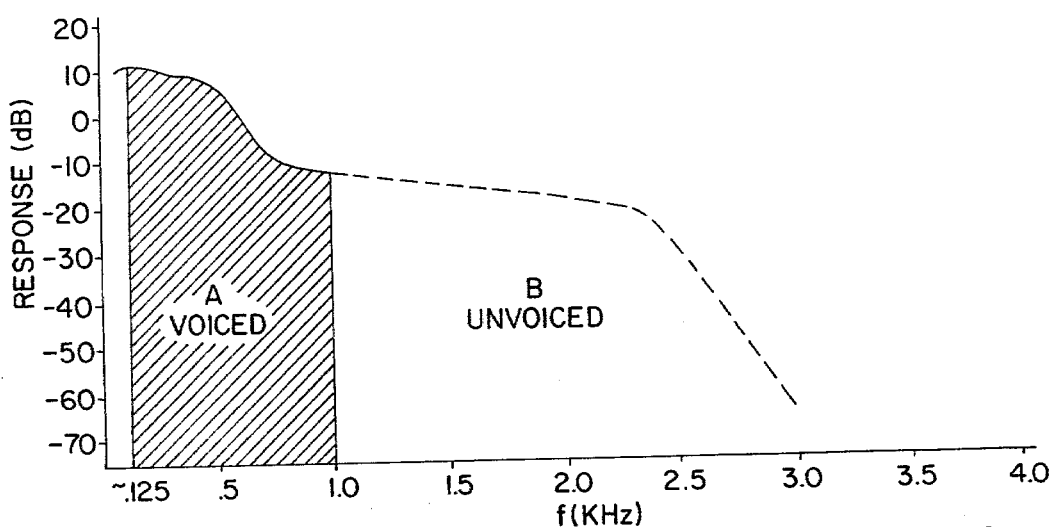
FIG.—4B. SPEECH SPECTRUM AT OUTPUT OF FILTER 12
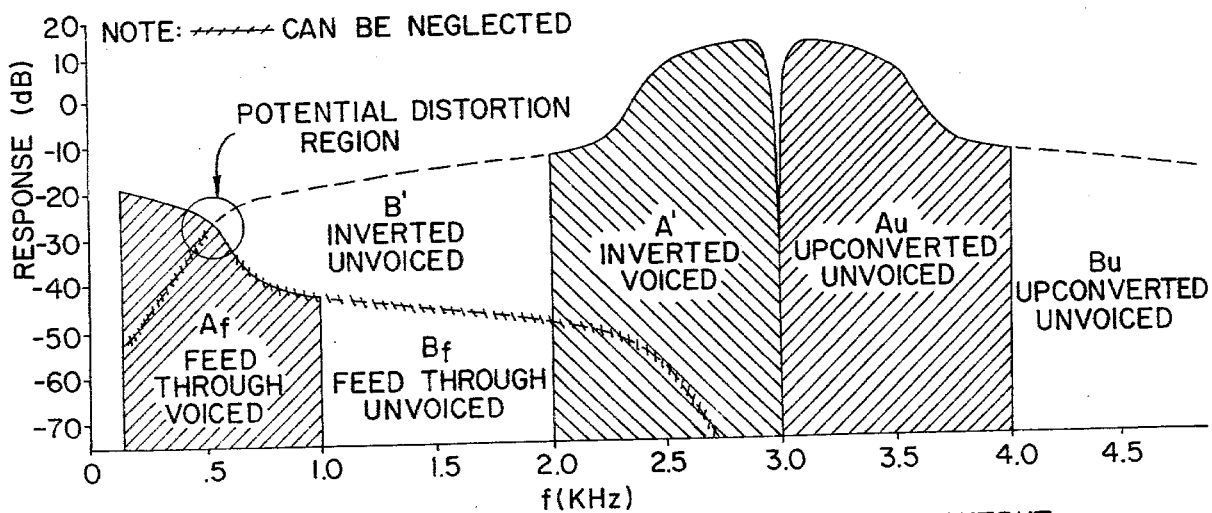
FIG.—4C. SPECTRUMS AT BALANCED MODULATOR OUTPUT

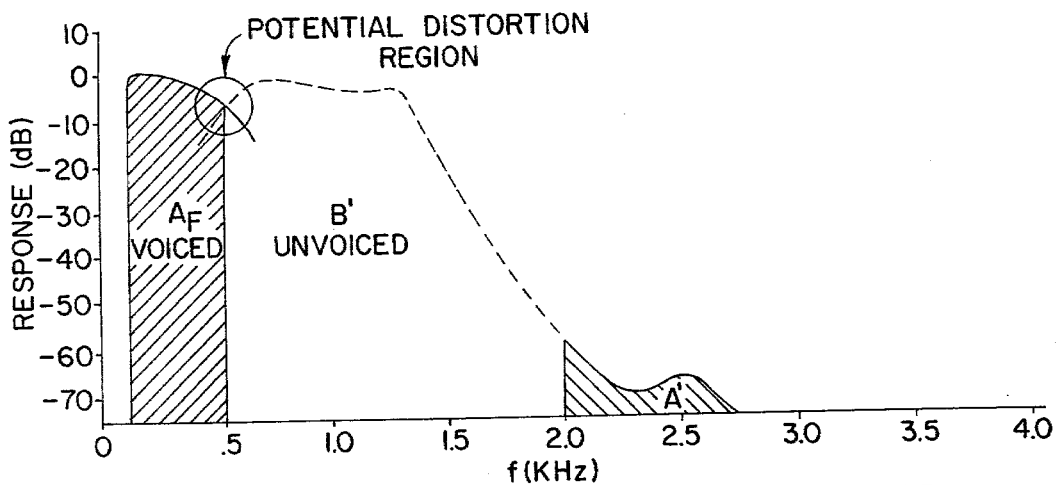
FIG.—4D. TRANSMITTED SPECTRUM AT OUTPUT OF TRANSMISSION FILTER 15
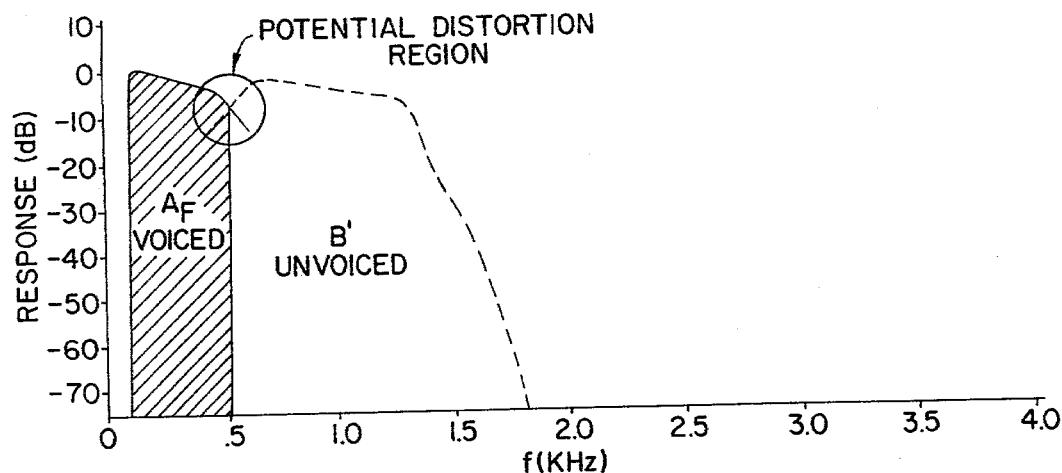
FIG.—4E. RECEIVED SPECTRUM AT OUTPUT OF RECEPTION FILTER 16
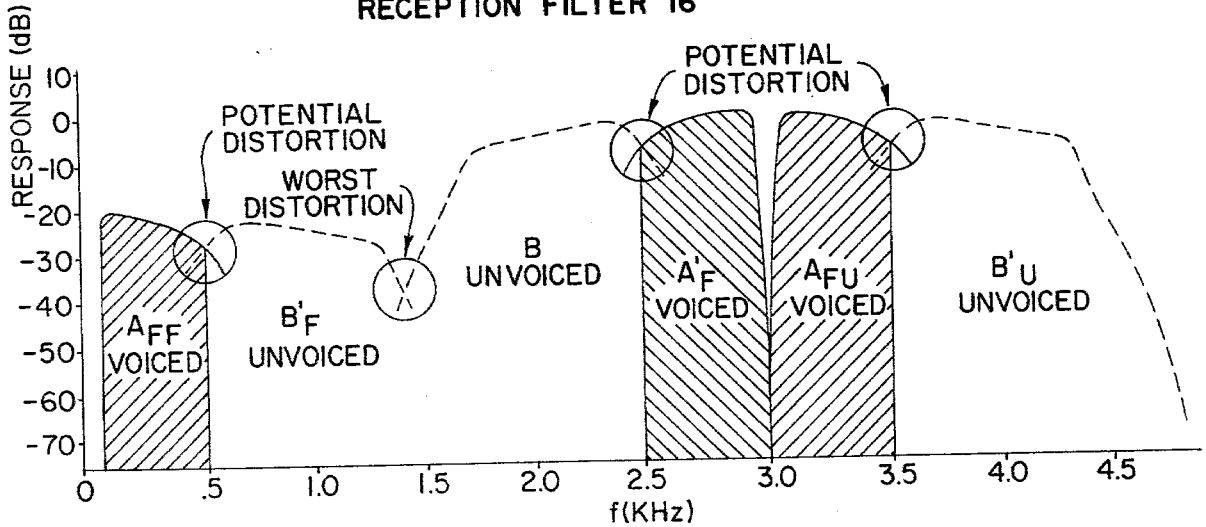
FIG.—4F. SPECTRUMS AT RECEIVER BALANCED MODULATOR OUTPUT

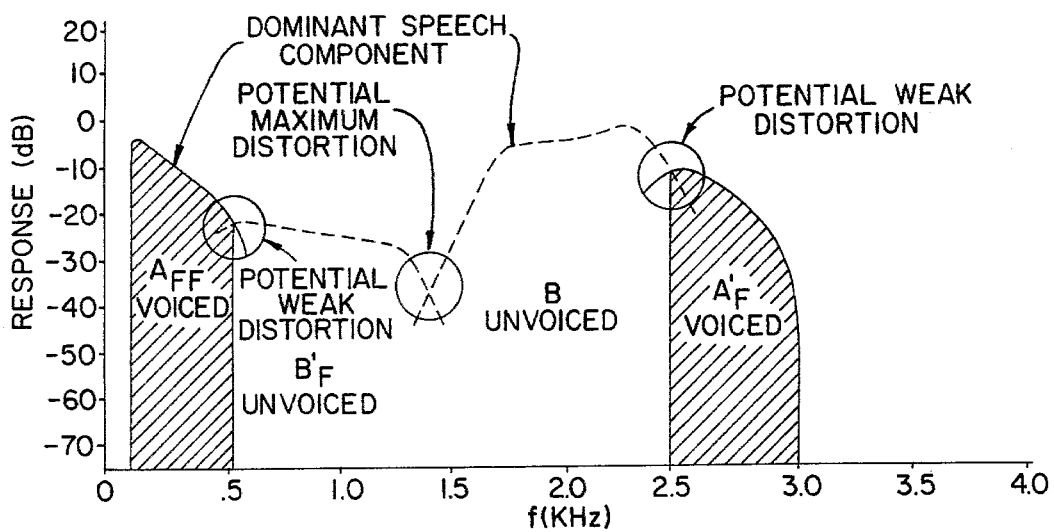
FIG.—4G. SPEECH SPECTRUM AT OUTPUT OF L.F. SHAPING CIRCUIT 20
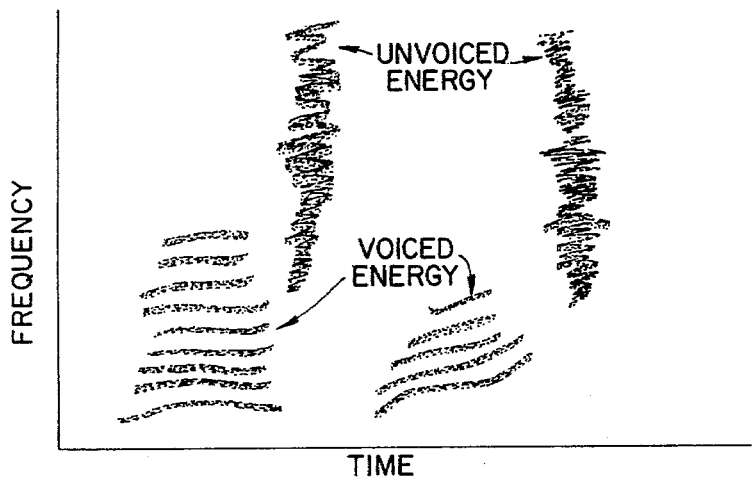
FIG.—5A. TYPICAL SPECTROGRAM SHOWING VOICED AND UNVOICED ENERGY
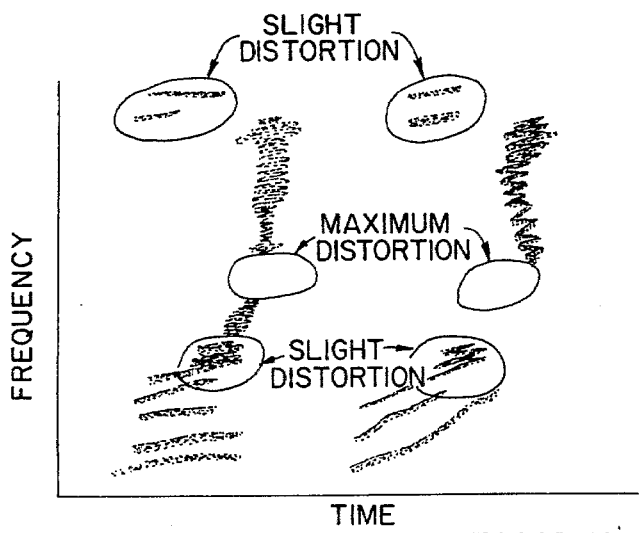
FIG.—5B. FINAL OUTPUT SPECTROGRAM

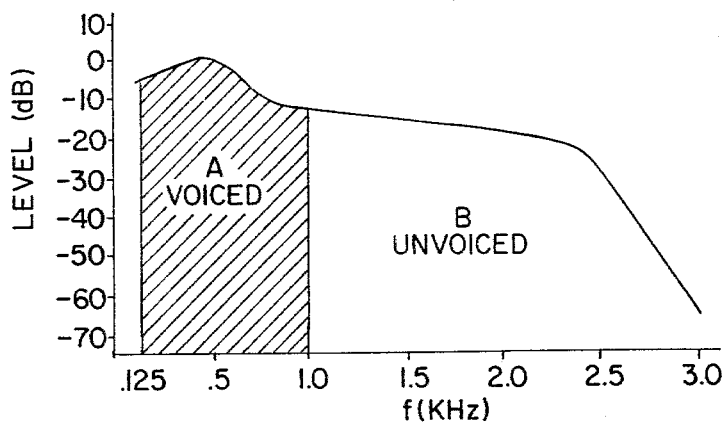
FIG._7A. OUTPUT OF FIRST LPF
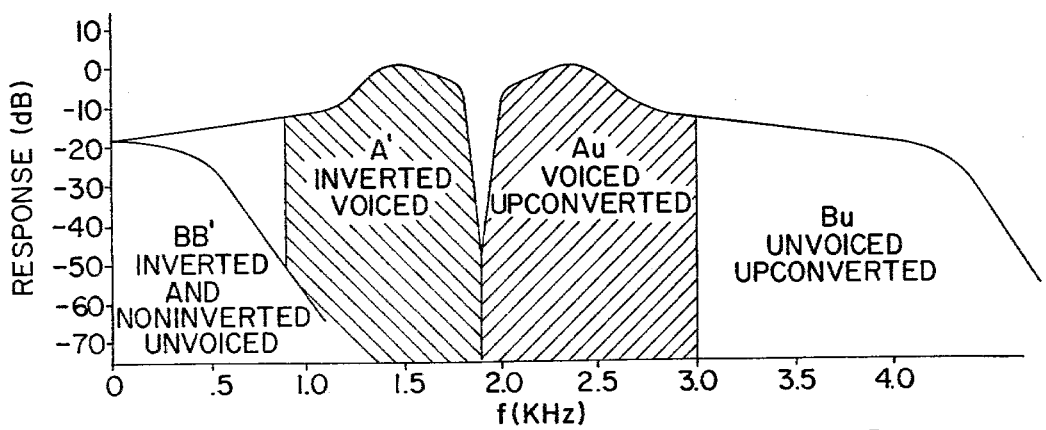
FIG._7B. OUTPUT OF BALANCED MODULATOR 13
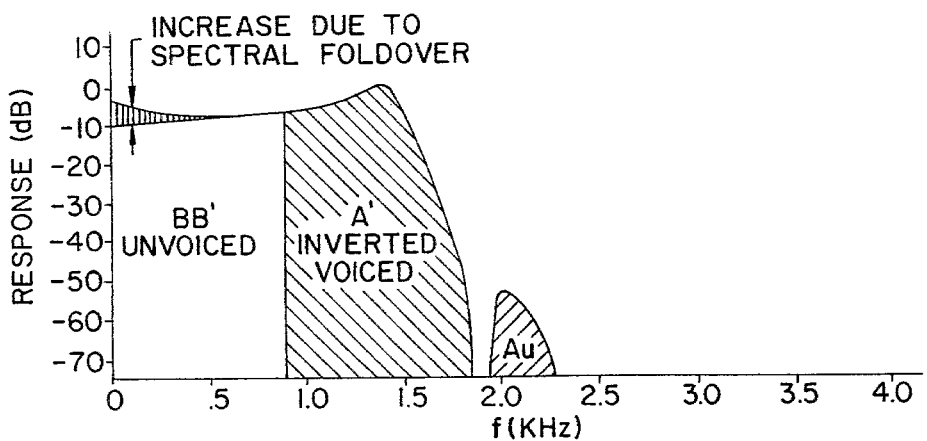
FIG._7C. TRANSMISSION FILTER 15 OUTPUT

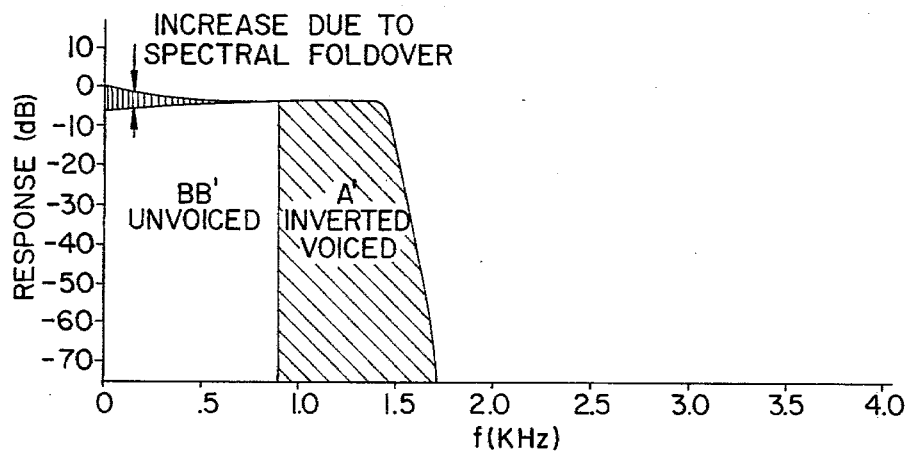
FIG._7D. RECEIVE FILTER 16 OUTPUT
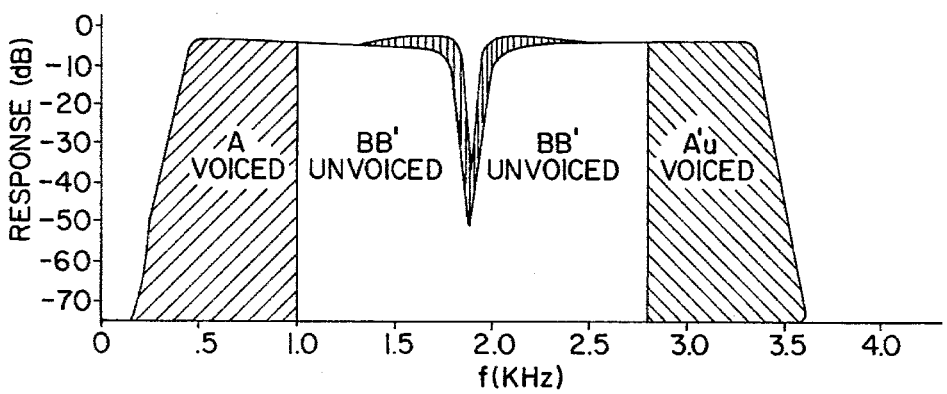
FIG._7E. BALANCED MODULATOR 17 OUTPUT
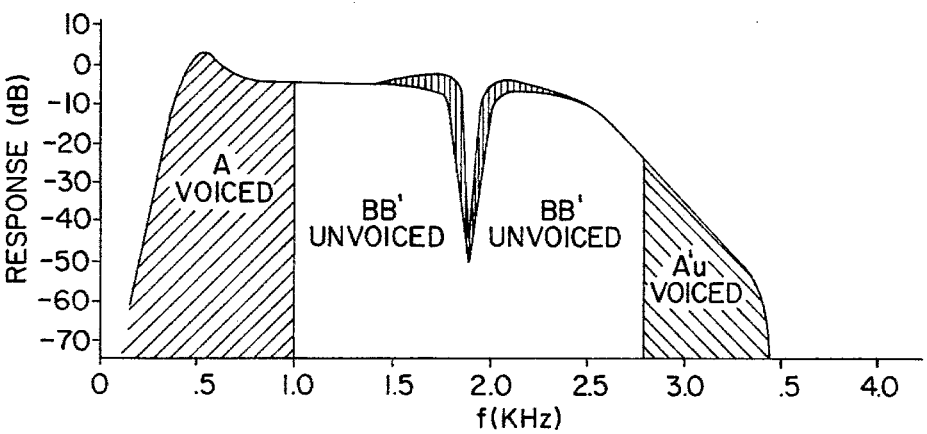
FIG._7F. OUTPUT OF SHAPING CIRCUIT 20

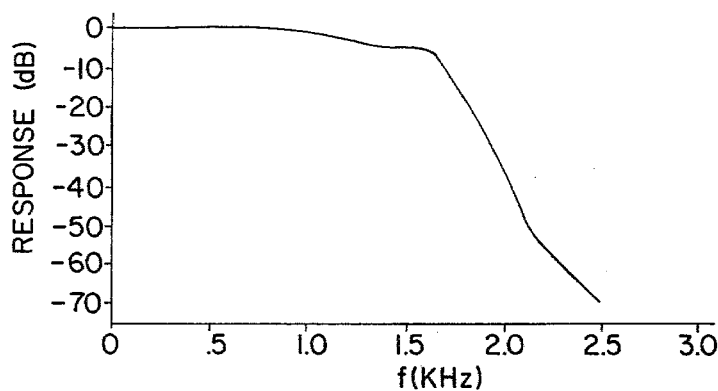
FIG._8.
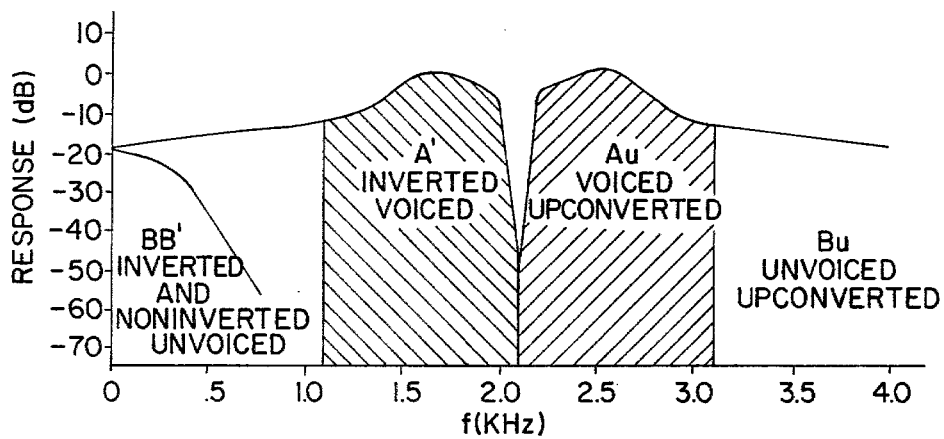
FIG._9A. OUTPUT OF BALANCED MODULATOR 13
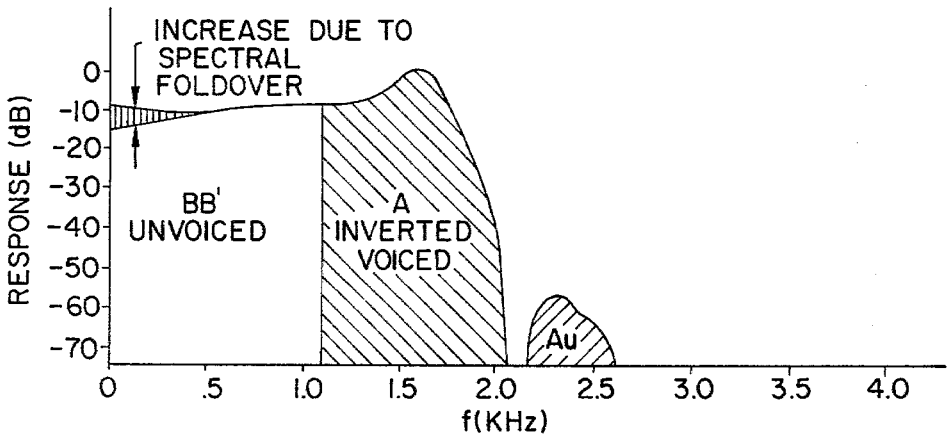
FIG._9B. TRANSMISSION FILTER 15 OUTPUT

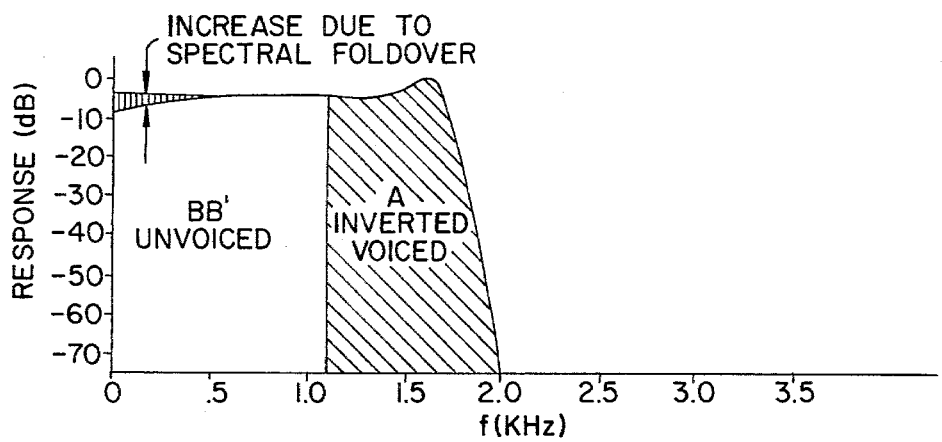
FIG._9C. RECEIVE FILTER 16 OUTPUT
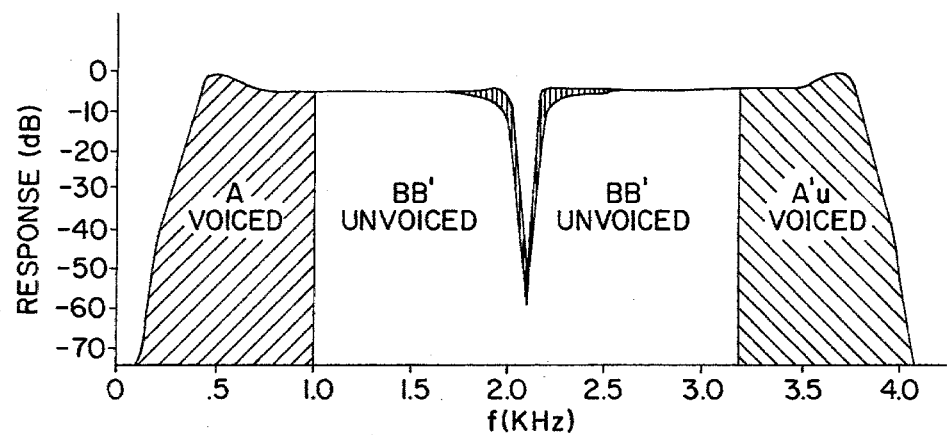
FIG._9D. BALANCED MODULATOR 17 OUTPUT
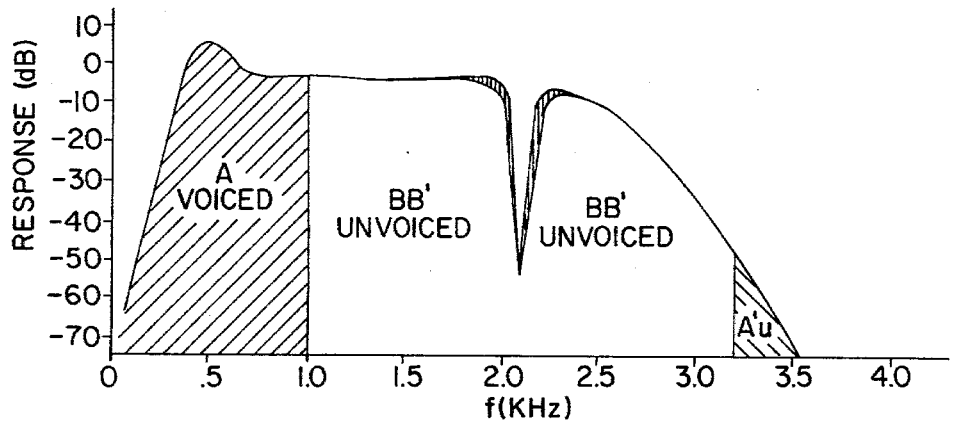
FIG._9E. OUTPUT OF SHAPING CIRCUIT 20

METHOD AND APPARATUS FOR BANDWIDTH REDUCTION

BACKGROUND OF THE INVENTION

This invention relates to communications systems in which information is transmitted from a sending station to a receiving station in the form of electrical or electromagnetic information bearing signals over a communication link having a predetermined system frequency bandwidth. More particularly, this invention relates to methods and systems for reducing the actual bandwidth occupied by the information bearing signals to improve the flow of information or to reduce the actual bandwidth requirements of the communication link. Specifically, this invention relates to systems and methods for reducing the actual bandwidth requirement of that class of signals having inherent time division and frequency division multiplexing, such as human speech signals, and comprises an improvement over the invention disclosed in U.S. Patent Application Ser. No. 749,857 filed Dec. 13, 1976 for "Narrow Band Voice Modulator System", the disclosure of which is hereby incorporated by reference.

It has long been known that the primary intelligibility of human speech (defined as the speech information content as opposed to an individual speaker's identifiable characteristics, such as voice timbre and the like) lies in the band from about 1000 to about 3000 Hz, and that human speech is naturally temporally divided into higher frequency components (the consonants) occurring in the range from about 1500 to about 3000 Hz and lower frequency components (vowels) occurring in the range from about 0 to about 1500 Hz. Stated differently, human speech may be characterized as information bearing signals having inherent time division and frequency division multiplexing due to the serial nature of speech pronunciation: i.e., a vowel and a consonant cannot occur at the same time. It should be noted that the time division and frequency division multiplexing of human speech is not absolute, i.e., vowel sounds may have frequency portions lying above 1500 Hz while consonants may have frequency components lying below 1500 Hz. However, from a statistical point of view, if significant energy in a particular speech utterance exists below 1500 Hz, then the probability of the existence of a very small amount of energy above 1500 Hz during the same time period is close to one. Conversely, if a high percentage of speech energy exists above 1500 Hz, there is a high probability that there will by very little energy below 1500 Hz for that same time period.

Efforts have been made in the past to exploit the above natural characteristics of human speech to reduce the actual bandwidth required to transmit such information from a sending station to a receiving station in order to (a) permit the use of a communication link having a bandwidth less than the normal bandwidth of 3000 Hz, or (b) permit more than one set of speech signals to be transmitted over the same communications link having the normal speech bandwidth of 3000 Hz. In an early system exemplified by the disclosure of U.S. Pat. No. 1,836,824 directed to a telephone communication system, parallel signal conduction paths are provided in the transmitting and receiving portion of a telephone apparatus, with each pair of signal paths comprising first means for passing only signals lying in a relatively low frequency range of 250-2250 Hz and a second path having means for passing only higher frequency signals lying in the range from 1250-3250 Hz. Signals in this higher frequency range are converted to equivalent signals lying in the lower frequency pass range of the first path with the output of each signal path being coupled to a common transmitting or receiving unit. The first and second signal paths are operated in a mutually exclusive mode by a switching device which permits the input signal to be coupled to either the lower frequency signal path or the higher frequency signal path, depending on the amplitude of the input signals, it having been experimentally observed that vowel sounds statistically have a greater amplitude than consonant sounds. Systems of this type suffer from the disadvantage that the switching elements inject undesirable noise into the speech signals transmitted or received, which noise predominantly lies within the ordinary frequency band of the communications system, and further from the disadvantage that the switching from the normally active higher frequency signal path to the lower frequency signal path is exclusively dependent upon the amplitude of the speech input signals, so that the occurrence of a consonant sound at a relatively large amplitude causes such relatively high frequency signals to be coupled to the relatively low frequency signal path with resultant signal loss.

A later approach employing a more sophisticated method and system, and exemplified by U.S. Pat. No. 2,726,283, employs a switching device at the output end of parallel signal paths and addition decision making circuitry for measuring the fundamental pitch of the input signal speech signals to enable time-sharing of the period of the fundamental by causing the low frequency signals to be coupled through the mixer switch during the first half period of the fundamental and the down converted consonant equivalent signals to be coupled through the mixer switch to the output terminal during the second half period of the fundamental. This arrangement suffers from the disadvantage that inherently one-half of the speech signal is lost since the normal temporal separation of the vowel and consonant portions of the speech signal is not relied upon. In addition, this arrangement suffers from the noise injection problem noted above due to the controlled switching that also requires rather complex electrical circuitry which is subject to frequency drift and other distortion introducing characteristics. Further, the circuitry required to measure the fundamental period adds further cost and complexity to the entire system.

In the above-reference U.S. patent application, a method and system are disclosed for reducing the actual bandwidth required for the intelligible transmission of speech signals or similar information-bearing signals which are inherently time and frequency division multiplexed, the method and system being relatively inexpensive to implement, highly reliable in performance, and devoid of the controlled switching elements and decision making circuitry noted above.

According to the invention of the referenced patent application, which is expressly referenced to an audio frequency communications system having a system frequency bandwidth of 3000 Hz, and lower and upper system frequencies of 0 and 3000 Hz, respectively, input speech signals are coupled through a low frequency shaping circuit for boosting and voiced lower frequency signal portions, and then through a band pass filter having a frequency attenuation portion at the upper end of the system pass band to reduce the spectral power of the upper frequency portions lying near the upper end of the band. The signals output from the band pass filter are fed through a balanced modulator and subsequently filtered to attenuate the portions of the resulting signals lying in the upper half portion of the system frequency band. The thus filtered signals, which consist of a low frequency feed through voiced portion, an inverted middle frequency unvoiced portion, and upper frequency inverted and up-converted voiced components, are transmitted to a receiving station at which the received signals are filtered to attenuate those portions lying in the upper half portion of the system frequency band and applied to a balanced modulator. The signals output from the balanced modulator, which consist of low frequency fed through voiced signal portions, overlapping reinverted unvoiced and inverted unvoiced portions, an inversion of the originally fed through voiced portions, and upconverted voiced and unvoiced components lying above the upper edge of the system frequency band, are filtered with a filter having a sharp attenuation characteristic adjacent the upper edge frequency of the system frequency band.

The resulting signals contain the essential information components with three potential distortion regions, one lying outside the upper limit of the system frequency band and the remaining two lying within the system frequency band. However, due to the inherent time and frequency division multiplexed nature of the signals, the potential distortion regions do not seriously impair the intelligibility of the finally reproduced speech signals and possess high intelligibility and quality.

SUMMARY OF THE INVENTION

The invention comprises an improved method and apparatus over the invention described immediately above and which provides improved intelligibility and quality to time and frequency division multiplexed input signals, while retaining the advantages of low cost and simple implementation, high performance reliability, and the elimination of any controlled switching elements and decision making circuitry formerly required by the prior art.

In a first aspect of the invention and with specific reference to an audio communication system having a frequency band from 0 to 3000 Hz, time and frequency division multiplexed input speech signals having relatively low frequency voiced portions and relatively high frequency unvoiced portions are coupled to a low frequency shaping circuit in which the low frequency voiced portions are selectively increased, and subsequently passed through a pre-mixing filter to sharply attenuate the higher frequency unvoiced portions at the upper end of the system frequency band. The filtered signals are coupled to a balanced modulator along with a carrier signal from a local oscillator whose frequency lies in the range from about 0.9 $f_u$, where $f^u$ is the upper frequency limit of the system frequency band, to about 1.33 $f^u$. The signals output from the balanced modulator, which contain feed through voiced and unvoiced portions and inverted voiced and unvoiced portions lying within the system frequency band, and up-converted voiced and unvoiced portions lying outside the system frequency band, are passed through a transmission filter having a sharp attenuation characteristic at approximately the midpoint of the system frequency band to substantially eliminate all frequency components lying in the upper half of this band and beyond prior to transmission to a receiving station.

The received signals are passed through a filter having a substantially similar amplitude-frequency response characteristic to that of the transmission filter in order to eliminate substantially all components except those corresponding to the feed through voiced components and the inverted unvoiced components, and the signals output from this filter are coupled to a second balanced modulator along with a carrier signal having a frequency lying in the range noted above. The signals output from the second balanced modulator, which contain the feed through voiced and inverted unvoiced portions and inverted feed through voiced and reinverted unvoiced portions all lying within the system frequency band, and up-converted feed through voiced and up-converted inverted unvoiced portions lying outside the system frequency band, are passed through a filter having an amplitude-frequency response characteristic substantially similar to that of the pre-mixing filter in order to eliminate the up-converted portions and attenuate the inverted feed through voiced portions. The signals output from the pre-mixing filter are fed through a low frequency shaping circuit in which the low frequency feed through voiced portions are selectively increased relative to the remaining signal portions.

The finally resulting signals output from the low frequency shaping circuit, while a mixture of the original voiced and unvoiced speech signals and their inversions, have a spectral energy distribution when converted to audible form which is highly perceivable to a human listener, with only weak potential distortion points at the transition region between the voiced and unvoiced portions (both direct and inverted) and a maximum potential distortion point at approximately the mid-region of the system frequency band. The potential weak distortion points cause only minimal degradation in signal intelligibility since voiced and unvoiced portions of speech are substantially temporally independent and only rarely occur simultaneously. The maximum distortion occurs at a point in the spectrum which is either normally devoid of any speech information, or which has the perceivable effect to the listener of a lowering of the energy of the speech perceived, i.e., at a "hole" in the speech spectrum, and this distortion is dominated by the lower frequency voiced portions and the higher frequency unvoiced portions to such an extent that this distortion is only slightly perceptible and has no substantial impairing effect on the intelligibility of the speech signals.

The quality of the reproduced speech signals may be adjusted for maximum quality in a given application by varying the feed through constant K and the frequency of the carrier signal applied to a given balanced modulator. The feed through constant K is varied by changing the level of the carrier energy relative to the level of the input speech signal energy. In general, as the frequency of the carrier signal is reduced toward the upper frequency limit 0.9 $f_u$, the pitch of the resulting speech signals increases and the feed through constant K may be reduced; conversely, as the frequency of the carrier signal is increased toward the upper practicable limit of approximately 1.33 $f_u$, the pitch of the resulting speech signals decreases and the feed through constant must be increased.

The invention can be more broadly characterized with reference to time and frequency division multiplexed signals having first portions lying predominantly within a first fractional bandwidth portion of a system frequency band and second portions lying predominantly within a second fractional bandwidth portion which lies outside the first fractional bandwidth portion. The first and second fractional bandwidth portions each have a band edge frequency associated thereto, and the first and second signal portions are substantially temporally spaced. In the case of speech signals, for example, the first signal portions correspond to the unvoiced portions of the speech signals lying predominantly within the upper system bandwidth portion, while the second signal portions correspond to the voiced portions of the speech signals lying predominantly within the lower system bandwidth portion. The signal processing from the input portion of the system through the transmission filter is characterized by the steps of selectively attenuating the first portions of the input signals lying adjacent the associated band edge frequency to produce modified signals, processing the modified signals to produce intermediate composite signals having an uninverted portion corresponding to the modified signals and an inverted portion corresponding to a frequency inversion of the modified signals substantially about the center frequency of the system frequency band, and selectively filtering the intermediate composite signals to substantially eliminate all portions thereof lying beyond the system frequency band center frequency.

The signal processing of the transmitted signals by the receiving station is characterized by the steps of selectively filtering the received signals to sharply attenuate any signal portions lying beyond the system frequency band center frequency, processing the filtered signals to produce intermediate composite signals having a direct portion corresponding to the filtered signals and an inverted portion corresponding to a frequency inversion of the modified signals substantially about the system frequency band center frequency, selectively attenuating those portions of the intermediate composite signals lying adjacent the band edge frequency $f_u$ associated to the first fractional bandwidth portion, and boosting the amplitude of those portions of the intermediate composite signals lying predominantly in the second fractional bandwidth portion.

In a second aspect of the invention, and with specific reference to an audio communication system having a frequency band from 0 to 3000 Hz, speech signals are passed through a pre-mixing filter to sharply attenuate the high frequency unvoiced portions lying adjacent the upper band edge frequency $f_u$ of 3000 Hz, and coupled to a balanced modulator along with a carrier signal from a local oscillator whose frequency is within the system frequency band and in the range from about 1.2 to about 1.8 times the −3 db attenuation frequency of a transmission filter to which the output of the balanced modulator is coupled. Preferably, the local oscillator frequency is that frequency at which the attenuation provided by the filter is −50 db. The signals output from the balanced modulator, which contain inverted voiced portions and both inverted and uninverted unvoiced portions, and up-converted voiced and unvoiced portions (but no discernible feed through portions), are passed through a transmission filter having a sharp attenuation characteristic beginning at a frequency in the range from about 0.3 $f_u$ to about 0.6 $f_u$ to substantially eliminate all frequency components lying closely adjacent the local oscillator frequency and above, prior to transmission to a receiving station.

The received signals are passed through a receiver filter having a substantially similar amplitude-frequency response characteristic to that of the transmission filter in order to eliminate substantially all frequency components lying closely adjacent the local oscillator frequency and above. The signals output from the receiver filter are coupled to a second balanced modulator along with a carrier signal whose frequency lies within the same range as that of the carrier signal used in the transmission portion of the invention. The signals output from the second balanced modulator, which contain reinverted voiced portions and a reinverted combination of the inverted and uninverted unvoiced portions, and an up-converted version of all of the preceding signals (but no discernible feed through portions), are passed though an output filter having an amplitude-frequency response characteristic substantially similar to that of the pre-mixing filter to attenuate primarily the up-converted inverted voiced portions.

The finally resulting signals produced from the output filter, while a mixture of the original voiced and unvoiced signals and their inversions, have a spectral energy distribution when converted to audible form which is highly perceivable to a human listener, with only a weak potential distortion region adjacent the upper band edge frequency $f_u$ and a maximum potential distortion region centered about the local oscillator carrier signal frequency. Both potential distortion regions cause only minimal signal degradation for the same reasons as those noted above with reference to the first aspect of the invention.

This second aspect of the invention can similarly be more broadly characterized with reference to time and frequency division multiplexed signals of the type noted above. The signal processing from the input portion of the system through the transmission filter is characterized by the steps of selectively attenuating the first portions of the input signals lying adjacent the associated band edge frequency $f_u$ to produce modified signals, processing the modified signals to produce intermediate composite signals having first and second frequency translated compound portions, the first compound portion corresponding to the modified signals frequency translated toward the first band edge frequency $f_u$ by a predetermined amount $f_0$, the second compound portion corresponding to an inversion of the modified signals frequency translated toward the second band edge frequency $f_1$ by a predetermined amount $f_u - f_0$ and folded back from the second band edge frequency $f_1$ into the system system frequency band; and selectively filtering the intermediate composite signals to substantially eliminate the first frequency translated compound portion, i.e., those signals lying at $f_0$ and beyond.

The signal processing of the transmitted signals by the receiving station is characterized by the steps of selectively filtering the received signals to sharply attenuate any signal portions lying at $f_0$ and beyond; processing the filtered signals to produce intermediate composite signals having an uninverted portion corresponding to the filtered signals and an inverted portion corresponding to a frequency inversion of the filtered signals about $f_0$; and selectively attenuating those portions of the intermediate composite signals lying adjacent the band edge frequency $f_u$ associated to the first fractional bandwidth portion.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a block diagram of a sending station according to the invention.

FIG. 2 is a block diagram of a receiving station according to the invention.

FIGS. 3A-C are amplitude vs. frequency response curves for various components of the FIG. 1 and FIG. 2 stations.

FIGS. 4A-G are amplitude vs. frequency curves showing the spectral distribution of time averaged speech at various portions of the sending station and receiving station;

FIGS. 5A and B are frequency vs. time spectrograms of speech signals at the input to the sending station and the output of the receiving station.

FIG. 6 is an amplitude vs. frequency response curve for a transmission filter of an alternate embodiment of the FIG. 1 and FIG. 2 stations;

FIGS. 7A-F are amplitude vs. frequency curves showing the spectral distribution of time averaged speech at various portions of the sending station and receiving station of the alternate embodiment;

FIG. 8 is an amplitude vs. frequency response curve for a transmission filter in a modified version of the alternate embodiment; and FIGS. 9A-E are amplitude vs. frequency curves showing the spectral distribution of time averaged speech at various portions of the sending station and receiving station of the modified alternate embodiment.

DESCRIPTION OF THE PREFERRED EMBODIMENTS

Turning now to the drawings, FIGS. 1 and 2 illustrate in block diagram form a first embodiment of a sending station and a receiving station, respectively, embodying the invention.

With reference to FIG. 1, an input terminal 10 is provided for receiving speech input signals generated by any suitable transducing device, such as a telephone transmitter, a microphone or the like. Input terminal 10 is coupled to the input of a low frequency shaping circuit 11 having the amplitude vs. frequency response characteristics shown in FIG. 3A, described below, and which functions to adjust the relative power levels of the signals lying within first and second fractional portions of the system frequency bandwidth in the manner described below. The function of band pass filter 12 is to strongly attenuate those frequency components of the input signals lying near the upper edge of the system frequency band prior to a frequency conversion described below in order to reduce distortion, and in all of the preferred embodiments described in more detail below band pass filter 12 has the amplitude vs. frequency response characteristics shown in FIG. 3B, i.e., a relatively linear response from the lower edge of the system frequency band and a sharp higher frequency attenuation with a $-6$ db attenuation factor at about 2500 Hz.

The output of filter 12 is coupled to the signal input of a balanced modulator 13, to the carrier input of which is coupled a carrier signal of appropriate frequency from a local oscillator 14. In the system of FIG. 1, local oscillator 14 generates a carrier signal train of a predetermined frequency in the range from about $0.9\,f_u$ to about $1.33\,f_u$, where $f_u$ is the upper edge frequency of the system bandwidth. In this embodiment, $f_u$ is 3 KHz and the range of the carrier signal is from about 2800 Hz to about 4000 Hz. The output of balanced modulator 13 is coupled through a second band pass filter 15 having the amplitude vs. frequency response characteristics shown in FIG. 3C and labelled "$H_5'$", which functions to sharply attenuate those frequency components lying in the upper half of the system bandwidth. The output of band pass filter 15 is coupled to a communication link, which may comprise a telephone hybrid coupled to a trunk line, a microwave transmitter and link, an FM transmitter or the like.

FIG. 2 illustrates a receiving station for the first embodiment of the invention which is similar in construction to the sending station of FIG. 1. With reference to FIG. 2, the reduced bandwidth information signals received from the sending station are first coupled through a band pass filter 16 having an amplitude vs. frequency response characteristic as shown in FIG. 3C and labelled "$H_6$" to substantially attenuate frequency components lying in the upper half of the system frequency band. The resulting filtered received signals are applied to the signal input of a balanced modulator 17. Balanced modulator 17 is also provided with a carrier signal train by a local oscillator 18, the frequency of the carrier signal train provided by oscillator 18 having a value lying in the same range as that noted above for local oscillator 14 of the sending station. It should be noted, however, that the frequency of the oscillator 18 carrier signal train may differ somewhat from that of the oscillator 14 carrier signal train, i.e., by $\pm 1\%$. The modulator 17 output signals are coupled through a band pass filter 19, whose amplitude vs. frequency response is substantially the same as that of filter 12, and to the input of the frequency selective shaping circuit 20 which is substantially identical to circuit 11. The output of frequency selective shaping circuit 20 is then coupled to any one of a number of appropriate follow on devices, such as a telephone receiver, an audio amplifier, taper recorder, or the like.

Critical to the proper operation of this first embodiment of the invention are the frequency response characteristics of shaping circuits 11, 20, low pass filters 12, 19 and band pass filters 15, 16; and the feed through constant K of balanced modulators 13, 17. It can be shown that potential distortion products exist which, unless compensated for, will render the original speech input signals unintelligible after their reception and reconversion by the receiving station in FIG. 2. To reduce these potential distortion products to an acceptable level (defined as one in which the received signals convey the intelligence originally presented), the product of the signal transfer characteristic $H_1$ of the shaping circuit 11 and the feed through constant K of modulator 13 should be such that the natural amplitude imbalance between the lower frequency portion of the input signals and the higher frequency portion of the input signals is substantially equalized before transmission over the communication link; while the product of the feed through constant K of the balanced modulator 17 and the frequency response of shaping circuit 20 should preferably be substantially equal to the same product of modulator 13 and shaping circuit 11.

For this first embodiment, it can be shown that the signal $x_4$ present at the output of filter 15, in response to the application of human speech signals in a period I to input terminal 10 is:

$$X_4 = D_v K H_1 \cos \omega_v t + \frac{D_u}{2} \cos (\omega_o - \omega_u)t$$

where $H_5 \cong 1$ for $f = f_v$ and $f = f_o - f_u$ when
$0.05 < f_v < 1.0$ K Hz
$0.05 < f_o - f_u < 1.0$ K Hz
where $D_v$ is the amplitude of the voiced component, $D_u$ is the amplitude of the unvoiced component, K is the feed through constant of modulator 13, $H_1$ is the amplitude spectral transfer function of low frequency shaping circuit 11, T is the period of one voiced-unvoiced speech interval, $\omega_v$ and $\omega_u$ are the angular frequencies of the voiced and unvoiced portions of the input speech signals, $\omega_o$ is the angular carrier frequency, $f_v$, $f_u$, and $f_o$ are the respective frequencies of the voiced portion, the unvoiced portion and the carrier, and the modulator 13 has a gain function of unity for the sum and difference components at the output thereof, infinite loss for the carrier feed through and K loss <1 for the input speech signals fed therethrough.

The transmitted signal thus comprises substantially only the inverted (lower side band) unvoiced (consonant) sounds and the feed through non-inverted (vowel) sounds. Since the voiced and unvoiced sounds are temporally separated, there is no theoretical distortion in the transmitted signal. In actuality, speech signals do exhibit a more gradual temporal transition from voiced to unvoiced sounds; however, the temporal separation is sufficiently pronounced so that significant spectral overlap does not occur.

Depending on the product of K $H_1$, the voiced portion of the signal is attenuated rather substantially so that the natural voiced to unvoiced level imbalance of 15-25 db is changed to approximately 0 db for transmission. Thus, the voiced and unvoiced signals share nearly equally the transmitter power or the line losses, depending on the nature of the communication link.

Similarly, the signal present at the output of low frequency shaping circuit 20 of FIG. 2 in response to the application to the input of filter 16 of a signal as defined by the above equation is $$x_8 = D_v K^2 H_1 H_{10} \cos \omega_v t +$$
$$\frac{D_v K H_1}{2} \cos (\omega_o - \omega_v)t +$$
$$\frac{D_u}{4} \cos \omega_u t + \frac{D_u K H_{10}}{2} \cos (\omega_o - \omega_u)t$$

where $H_{10}$ is the amplitude spectral transfer function of low frequency shaping circuit 20 and the remaining symbols are as defined above.

There thus exist two primary distortion terms: first, the up-converted feed through voiced energy at frequency $\omega_o - \omega_v$; second, the down-converted feed through unvoiced energy at frequency $\omega_o - \omega_u$. The first distortion term is substantially eliminated by the cutoff frequency of band pass filter 19. The second distortion term is minimized by amplifying the desired low frequency energy in low frequency shaping circuit 20 to dominate the down-converted high frequency energy. The distortion actually present at the output of circuit 20 has been found to be qualitatively insignificant.

FIGS. 4A-4G illustrate the spectral content of speech signals at various stages of the sending station of FIG. 1 and the receiving station of FIG. 2. As seen in FIG. 4A, which is a typical time average amplitude-frequency characteristic of human speech, the signal energy is seen to consist essentially of a lower frequency voiced region A, a higher frequency unvoiced region B, and a transition region dividing the two.

FIG. 4B illustrates the time averaged amplitude-frequency spectrum of the speech signals of FIG. 4A after passing through low frequency shaping circuit 11 and band pass filter 12 having the response characteristics illustrated in FIGS. 3A and 3B, respectively. As shown in FIG. 4B, the lower portion of the voiced region A has been amplified and the upper portion of the unvoiced region B lying beyond about 2500 Hz has been sharply attenuated.

FIG. 4C illustrates the spectrum resulting from passing the signals from FIG. 4B through a balanced modulator 13 having a feed through constant K as described above and operated with a carrier frequency of 3000 Hz. The spectrum can be seen to consist of a low frequency voiced region $A_f$ and an unvoiced region $B_f$ resulting from modulator feed through, an inverted contribution consisting of regions B' and A' which are the inverted unvoiced and voiced components, respectively, corresponding to the difference frequencies, and an up converted contribution consisting of regions $A_u$ and $B_u$ corresponding to the sum frequencies and extending from the upper 3000 Hz edge of the system frequency band. Since the region $B_f$ is of substantially smaller amplitude compared to the overlying inverted contributions (note that all figures are drawn to a logarithmic scale on the ordinate axis), the influence of the $B_f$ signals is negligible when compared to the overlying inverted regions B', A'. Similarly, the low frequency portion of the inverted region B' is smaller in amplitude than the overlying feed through portion $A_f$ and thus can likewise provide little contribution. The crossover region at approximately 500 Hz is a potential distortion region; however, since the signals to be processed by the invention are postulated as inherently time and frequency division multiplexed with respect to voiced and unvoiced signals, any actually resulting distortion is very small. It should be noted that the input signal of FIG. 4A is a time averaged frequency spectrum: accordingly, amplitude comparisons between the various overlapping spectra are not as definitive as would be the case if a real time spectrum were used.

FIG. 4D illustrates the time averaged amplitude frequency spectrum resulting from passing the signals output from balanced modulator 13 through band pass filter 15 having the frequency characteristic $H_5$ shown in FIG. 3C. As seen in FIG. 4D, and comparing this figure with FIG. 4C, the formerly present higher frequency regions $A_u$ and $B_u$ lying above 3000 Hz are completely eliminated, inverted voiced region A' is substantially attenuated (well below the 40 db point), and the signals to be transmitted consist of feed through voiced region $A_f$, and inverted unvoiced region B', with a slight contribution from inverted voiced region A'.

FIG. 4E illustrates the time averaged amplitude-frequency spectrum resulting when signals having a time averaged spectrum as shown in FIG. 4D are passed through the receiving station band pass filter 16 having the frequency characteristic $H_6$ shown in FIG. 3C. As seen in FIG. 4E, the feed through voiced region $A_f$ and the portion of the inverted unvoiced region B' extending to approximately 1500 Hz are substantially unaffected, the remaining portion of inverted unvoiced region B' lying above about 1500 Hz is sharply attenuated and the inverted voiced contribution A' is completely eliminated.

FIG. 4F illustrates the time averaged spectrum of signals which result from passing the signals from band pass filter 16 through balanced modulator 17 having a feed through constant K of the type described above and a carrier frequency of 3000 Hz. As seen in FIG. 4F, the time averaged spectrum consists of the upper frequency sum products $A_{fu}$ and $B'_u$, the feed through signals in the lower frequency range consisting of regions $A_{ff}$ and $B'_f$, and the difference products consisting of the regions B and $A'_f$. There are four regions of potential distortion: viz., the regions noted at approximately 500 Hz, 1500 Hz, 2500 Hz and 3500 Hz.

FIG. 4G shows the signals resulting from passing the balanced modulator 17 output signals through band pass filter 19 having the frequency characteristic shown in FIG. 3B. The essential information components $A_{ff}$, corresponding to the voiced speech signals, and B, corresponding to the unvoiced speech signals, dominate the time averaged spectrum. The potential distortion point at 3500 Hz is completely eliminated. The potential distortion point at 2500 Hz still exists, but signals at this frequency when heard by a human listener appear only as higher harmonics of the voiced signal and thus are essentially unobjectionable when reproduced in audio form. The seemingly strong distortion point at approximately 500 Hz, while potentially severe, does not adversely affect the signal because the overlapping spectra at that point do not occur at the same time (due to the time and frequency division multiplexed nature of the signals). Lastly, the maximum distortion point at 1500 Hz occurs at a "hole" in the middle of the speech spectrum and, at worst, is merely perceived as noise.

FIGS. 5A and B are illustrative spectrograms in the frequency-time domain illustrating the voiced and unvoiced energy present in typical human speech signals at the input to the sending station and at the output of the receiving station, respectively. As shown in both these figures, the voiced energy is separated from the unvoiced energy in a substantially discrete fashion, both with respect to frequency and time. With reference to FIG. 5B, the distortion regions corresponding to 500, 1500 and 2500 occur in portions of the spectrum where no excessive listener distortion occurs. Thus, even though the potential for severe distortion exists, the actual resulting speech signals are highly intelligible and of good quality due to the inherent nature of the signals themselves and the frequency selective manner in which the signals are processed through the system of the invention.

As noted above, the signal carrier frequency of local oscillators 14 and 18 associated to balanced modulators 13, 17, respectively, may vary in the range from about 2800 to about 4000 Hz, i.e., from 0.9 $f_u$ to 1.33 $f_u$. The actual value selected for the carrier frequency is primarily dependent upon the desired characteristics of the reproduced speech signals, particularly the timbre. In general, at the lower frequency end of this range (viz., around 2800 Hz), the reproduced speech signals will be higher pitched, while at the upper end of this range the reproduced speech signals will have a lower pitch. It should be noted that the required optimum amount of balanced modulator feed through signal $A_f$ and $B_f$ varies with the frequency of the carrier signal train, with less feed through being required at the lower end (2800 Hz) of the range and more feed through being required at the upper end (4000 Hz) of this frequency range. The amount of feed through signal is adjusted by varying the feed through constant K for each balanced modulator 13, 17. This adjustment can be effected by varying the level of the carrier signal train energy relative to the level of the input speech energy. In actual practice, these adjustments can best be made on an empirical basis to select the optimum system characteristics.

The actual circuitry for physically constructing the low frequency shaping circuits 11, 20 and balanced modulators 13, 17 is shown in FIGS. 5-8 of the above-referenced copending U.S. patent application; while the circuitry required for band pass filters 15, 16 can be constructed by modifying the corresponding circuitry from this referenced application.

Briefly described, band pass filters 12, 19 provide a sharp roll-off at about 2500 Hz (−6 db point) and preferably comprise two cascaded six-pole Chebyshev filters each having 0.1 db inband ripple.

Balanced modulators 13, 17 may be the type shown in FIG. 7 of the above-referenced patent application having a nominal feed through constant K equal to 0.1, adjustable in the manner described above.

Band pass filters 15, 16 are filters of the transitional Ledgendre Thompson type, each comprising two cascaded six-pole sections having a −3 db cutoff frequency of 1200 Hz.

FIG. 6 illustrates the amplitude vs. frequency response characteristic of a first modified version of filters 15, 16, respectively, used in an alternate embodiment of the invention which provides improved signal processing performance. The remaining fundamental building blocks of the alternate embodiment are identical to those illustrated in FIGS. 1 and 2 and thus are not separately illustrated for this alternate embodiment. It should be noted that shaping circuit 11 is only required in this embodiment when the frequency transmission characteristics of the communication link cause selective attenuation of the low frequency signal portion during transmission.

As seen in FIG. 6, the filters 15, 16 provide substantially linear response from the lower edge of the system frequency band to approximately 800 Hz and progressively sharper attenuation beyond this point. A filter having the FIG. 6 characteristics can be realized by means of two cascaded six-pole Ledgendre filters each having a −3 db cutoff frequency of 1400 Hz and an additional single-pole filter of the same type with a −3 db cutoff frequency of 800 Hz.

For a system with filters 15, 16 of the FIG. 6 type, the carrier frequency employed with balanced modulators 13, 17 should preferably be 1900 Hz, and the level of the carrier signal train injected into the balanced modulators should be relatively high to substantially eliminate any feed through component.

FIGS. 7A-7F show the time averaged amplitude-frequency spectrum of signals at selected portions of the sending station and receiving station of a system employing filters 15, 16 of the FIG. 6 type, in response to the application of speech signals having the time averaged amplitude-frequency characteristic shown in FIG. 4A. FIG. 7A shows the spectrum of the signals of FIG. 4A after passing through filter 12 of a system devoid of shaping circuit 11, the filter 12 having the characteristic shown in FIG. 3B. As shown in this figure, the upper portion of the unvoiced region B lying beyond about 2500 Hz is sharply attenuated, while the voiced region A is substantially unaffected due to the absence of low frequency shaping circuit 11.

FIG. 7B shows the spectrum resulting from passing the signals from FIG. 7A through balanced modulator 13 having a carrier signal train input of 1900 Hz, which is slightly above the −50 db attenuation frequency of the transmission filter 15. The spectrum consists of an inverted contribution consisting of voiced and unvoiced regions A' and B', and a non-inverted unvoiced region B folded back from the lower band edge frequency, corresponding to the difference frequencies, and an up-converted contribution consisting of regions $A_u$ and $B_u$ corresponding to the sum frequencies. Notable is the absence of any feed through components which are eliminated due to injection of a relatively high level carrier signal train into the balanced modulator 13. For example, for a type MC 1496L balanced modulator available from Motorola, Inc., and input information signal having a magnitude of 300 mV rms, the level of the carrier signal train should be 60 mV rms or greater. In contrast, a carrier signal train level having a magnitude in the range from about 10 to about 40 mV rms is employed with the same balanced modulator in the first embodiment of the invention described above with reference to FIGS. 1–5.

FIG. 7C illustrates the time averaged amplitude-frequency spectrum resulting from passing the signals output from balanced modulator 13 through filter 15 having the frequency characteristic shown in FIG. 6. As seen in FIG. 7C, up-converted regions $A_u$ and $B_u$ are virtually eliminated (only a small portion of $A_u$ remains), the combined B B' region is boosted slightly due to the overlap between the inverted B' and non-inverted B regions, and the upper frequency portion of the A' inverted region is somewhat attenuated.

FIG. 7D illustrates the time averaged amplitude-frequency spectrum resulting when signals having the time averaged spectrum shown in FIG. 7C are passed through band pass filter 16 having the frequency characteristics shown in FIG. 6. As shown in this figure, the remaining portion of the up-converted $A_u$ region is completely eliminated, the overlapping B B' portions are slightly boosted, and the higher frequency portion of the A' inverted region is slightly attenuated.

FIG. 7E shows the time averaged spectrum of signals resulting from passing the signals from band pass filter 16 through balanced modulator 17 having a carrier signal train input also of 1900 Hz. As seen in this figure, the time averaged spectrum consists of the upper frequency sum products B $B'_u$ and $A'_u$, and the reinverted voiced region A and unvoiced region B B', the latter comprising the original unvoiced portion B and the overlapping inverted unvoiced portion B'.

FIG. 7E shows the signals resulting from passing the balanced modulator 17 output signals through band pass filter 19 and shaping circuit 20 having the frequency characteristics shown in FIGS. 3B and 3A, respectively. As seen in this figure, the time averaged spectrum consists of the lower frequency voiced region A which closely approximates the original voiced portion of the input speech spectrum, the unvoiced region B B' extending from approximately 1000 to 2800 Hz, and a small inverted up-converted voiced portion $A'_u$ at the upper edge of the system frequency band. The distortion in the unvoiced portion of the resulting signals shown in FIG. 7F slightly impairs the quality of the speech signals: however, since the unvoiced portion of the speech spectrum can be characterized as noise-like, the quality of the resulting signals remains quite high. In addition, the considerations discussed above with respect to the inherent time and frequency division multiplexed nature of the input speech signals apply to this alternate embodiment, so that the potential distortion in the resulting signals is exaggerated, due to the fact that the analysis pertains to a time averaged spectrum.

FIG. 8 illustrates the amplitude vs. frequency response characteristic of a second modified version of filters 15, 16, respectively, used in a modified alternate embodiment of the invention and which provide additional signal processing performance improvement. The remaining fundamental building blocks in the alternate embodiment are identical to those illustrated in FIGS. 1 and 2 and thus are not separately illustrated for this alternate embodiment.

As seen in FIG. 8, the filters 15, 16 provide substantially linear response from the lower edge of the system frequency band to approximately 800 Hz and progressively sharper attenuation beyond this point, in a manner similar to the filter characteristics shown in FIG. 6. However, the sharper attenuation portion of the characteristic is shifted to the right in FIG. 8 from the corresponding portion in FIG. 6.

A filter having the FIG. 8 characteristics can be realized by means of two cascaded six-pole Ledgendre filters each having a −3 db cutoff frequency of 1700 Hz and an additional single-pole filter of the same type with a −3 db cutoff frequency of 800 Hz.

For a system with filters 15, 16 of the FIG. 8 type, the carrier frequency employed with balanced modulators 13, 17 should preferably be 2100 Hz, and the level of the carrier signal train injected into the balanced modulators should also be relatively high to substantially eliminate any feed through components.

FIGS. 9A–9E show the time averaged amplitude-frequency spectrum of signals at selected portions of the sending station and receiving station of a system employing filters 15, 16 of the FIG. 8 type, in response to the application of speech signals having the time averaged amplitude-frequency characteristics shown in FIG. 4A. The spectrum of the signals of FIG. 4A after passing through filter 12 of a system devoid of shaping circuit 11, is shown in FIG. 7A, and comprises a sharply attenuated upper portion of the unvoiced region B lying beyond about 2500 Hz and a substantially unaffected voiced region A.

FIG. 9A shows the spectrum resulting from passing the signals from FIG. 7A through balanced modulator 13 having a carrier signal train input of 2100 Hz, which occurs at the −50 db attenuation frequency of the transmission filter 15. The spectrum is substantially similar to that shown in FIG. 7B; however, the up-converted contribution consisting of regions $A_u$ and $B_u$ corresponding to the sum frequencies, and the inverted contribution consisting of voiced and unvoiced regions A' and B', are all shifted upwardly by 200 Hz, while the non-inverted unvoiced region B folded back from the lower band edge frequency is more steeply attenuated than the corresponding portion shown in FIG. 7B.

FIG. 9B illustrates the time averaged amplitude-frequency spectrum resulting from passing the signals output from balanced modulator 13 through filter 15 having the frequency characteristic shown in FIG. 8. This spectrum is similar to that illustrated in FIG. 7C; however, the spectrum is shifted upward in frequency, has a sharper knee at approximately the midpoint of the system frequency bandwidth, and a shorter overlapping unvoiced region adjacent the lower band edge frequency, as compared to the spectrum of FIG. 7C.

FIG. 9C illustrates the time averaged amplitude-frequency spectrum resulting when signals having the time averaged spectrum shown in FIG. 9B are passed through band pass filter 16 having the frequency characteristic shown in FIG. 8. As shown in this figure, the remaining portion of the up-converted $A_u$ region is completely eliminated, the overlapping B B' portions are slightly boosted, and the higher frequency portion of the A' inverted region is slightly attenuated. Comparing the spectra of FIG. 9C with that of FIG. 7D, the former is essentially flat from the lower band edge frequency to a point just below the midpoint of the system bandwidth frequency, has a shorter overlapping portion at the lower band edge frequency, and a knee at approximately the midpoint of the system frequency bandwidth.

FIG. 9D shows the time averaged spectrum of signals resulting from passing the signals from band pass filter 16 through balanced modulator 17 having a carrier signal train input also of 2100 Hz. A comparison of the spectrum of FIG. 9D with that of FIG. 7E illustrates that they are essentially identical, with the exception that the signal is symmetric about the 2100 Hz carrier frequency (as opposed to the 1900 Hz carrier frequency of FIG. 7E), the knees in the voiced portions A, $A_u'$ are present, and the overlapping B B' portions are reduced.

FIG. 9E shows the signals resulting from passing the balanced modulator 17 output signals from FIG. 9D through band pass filter 19 and shaping circuit 20 having the frequency characteristics shown in FIGS. 3D and 3A, respectively. As seen in this figure, the time averaged spectrum consists of the lower frequency voiced region A which closely approximates the original voiced portion of the input speech spectrum, the unvoiced region B B' extending from approximately 1000 Hz to a frequency slightly beyond the upper band edge frequency, and a small inverted up-converted voiced portion $A'_u$ lying outside the upper edge of the system frequency band. The potential distortion in the unvoiced portion centered about 2100 Hz is reduced in magnitude and also more narrowly confined than the corresponding portion shown in FIG. 7F. As a result, the quality of the speech signals is greater than that provided by a system employing the filters 15, 16 of FIG. 6.

It should be noted that the alternate embodiment employing filters 15, 16 of the type having the characteristics of FIGS. 6 and 8 may have different parameters than those specifically noted above, i.e., the filter cutoff frequencies may differ and the carrier signal train frequency may also differ in a corresponding fashion. Thus, while filters having two different spectral characteristics and corresponding associated balanced modulator frequencies have been specifically described, other combinations may be employed, as desired. In general, the frequency of the carrier signal train should lie in the range from about 1.2 to about 1.8 times the $-3$ db attenuation frequency of the associated filters 15, 16. Further, the carrier signal train frequency should preferably be closely adjacent or exactly equal to the $-50$ db attenuation point of the associated filters 15, 16. In addition, the level of the carrier signal train should be sufficiently high in order to ensure that the sum and difference product signals output from the balanced modulators 13, 17 completely dominate the feed through signals.

As will now be apparent, in the preferred embodiments the fractional bandwidth dividing line has been chosen at approximately the midpoint of the system bandwidth, which allows a spectral division by a factor of 2 with a system having a frequency pass band of 3000 Hz. It should be noted that other numerical values may be chosen for the dividing line, depending primarily on the expected average energy spectral density of the input signals for which the system is designed. Further, a dead band may be provided, if desired, between the upper and lower fractional bandwidth portions so that the upper frequency limit of the lower bandwidth portion is lower in numerical value than the lower frequency limit of the upper bandwidth portion.

The above described invention is adaptable for use in many types of signal communication systems. For example, the invention may be incorporated into Citizens Band or amateur radio transceivers, telephone hand sets, underwater signalling devices, high speed data transmission systems, and can be used beneficially in virtually all types of voice modulation systems, such as amplitude, double side band, single side band, vestigial side band and frequency modulation systems. It is noted that, when employed in a frequency modulation system, the invention may be used to either reduce transmission bandwidth or provide improved signal to noise ratio (since the FM carrier may be deviated twice as far with the invention due to the fact that the reduced band width signal is one-half the band width of the normal base band speech signal.)

While the above provides a full and complete disclosure of the preferred embodiments of the invention, various modifications, alternate constructions and equivalents may be employed without departing from the true spirit and scope of the invention. For example, while filters 12, 15, 16 and 19 have been described as band pass filters, the term low pass filter is functionally equivalent to those systems in which the lower band edge frequency is closely adjacent the lower end of the frequency spectrum of interest. Therefore, the above description and illustrations should not be construed as limiting the scope of the invention which is defined by the appended claims.

What is claimed is:

1. A method of transmitting information-bearing input signals from a sending station to a receiving station via a communication link having a predetermined system frequency bandwidth, said input signals having first portions lying predominantly within a first fractional portion of said system frequency bandwidth and second portions lying predominantly within a second fractional portion of said system frequency bandwidth, said first and second fractional bandwidth portions each having a different band edge frequency associated therewith, said first and second signal portions being substantially temporally spaced and said second fractional bandwidth portion lying outside said first fractional bandwidth portion, said method comprising the steps of:
  (a) selectively attenuating said first portions of said input signals lying adjacent the associated band edge frequency to produce modified signals;
  (b) processing said modified signals to produce first intermediate composite signals comprising an uninverted portion corresponding to said modified signals and an inverted portion corresponding to a frequency inversion of said modified signals about substantially the center frequency of said system frequency bandwidth;

(c) selectively filtering said first intermediate composite signals to substantially eliminate all portions thereof lying in the range between said center frequency and one of said different band edge frequencies;

(d) continuously coupling the signals resulting from step (c) to a transmitting device;

(e) transmitting the signals coupled to said transmitting device to said receiving station;

(f) selectively filtering the received signals to sharply attenuate any signal portions lying in said range;

(g) processing the signals resulting from step (f) to produce second intermediate composite signals comprising a direct portion corresponding to said resulting signals and an inverted portion corresponding to a frequency inversion of said resulting signals about substantially said center frequency;

(h) selectively attenuating those portions of the second intermediate composite signals lying adjacent the band edge frequency associated with said first fractional bandwidth portion; and (i) amplifying the amplitude of those portions of said second intermediate composite signals lying predominantly in said second fractional bandwidth portion.

2. The method of claim 1 wherein said step (b) of processing includes the steps of generating a carrier signal having a predetermined frequency and modulating said modified signals with said carrier signal.

3. The method of claim 2 wherein said carrier signal has a frequency nf, where f is the band edge frequency associated with said first frictional bandwidth portion and n is a number lying in the range from about 0.9 to about 1.33.

4. The method of claim 3 wherein said carrier signal frequency is equal to said band edge frequency associated with said first fractional bandwidth portion.

5. The method of claim 1 wherein said step (g) of processing includes the steps of generating a second carrier signal having a predetermined frequency and modulating said filtered signals with said carrier signal.

6. The method of claim 5 wherein said second carrier signal has a frequency nf, where f is the band edge frequency associated with said first fractional bandwidth portion and n is a number lying in the range from about 0.9 to about 1.33.

7. The method of claim 6 wherein said second carrier signal frequency is equal to said band edge frequency associated with said first fractional bandwidth portion.

8. A communications systems for transmitting information bearing input signals from a first location to a second location via a communication link having a predetermined system frequency bandwidth, said input signals having first portions lying predominantly within a first fractional portion of said system frequency bandwidth and second portions lying predominantly within a second fractional portion of said system frequency bandwidth, said first and second fractional bandwidth portions each having a different band edge frequency associated therewith, said first and second signal portions being substantially temporally spaced and said second fractional bandwidth portion lying outside said first fractional bandwidth portion, said system comprising:

sending station means including:

input terminal means adapted to receive said input signals;

first filter means coupled to said input terminal means for selectively attenuating said first portions of said input signals lying adjacent the band edge frequency associated with said first fractional bandwidth portion to produce modified signals;

first processing means coupled to said first filter means for generating first intermediate composite signals comprising an uninverted portion corresponding to the modified signals and an inverted portion corresponding to a frequency inversion of said modified signals about substantially the center frequency of said system frequency bandwidth;

second filter means for selectively filtering said first intermediate composite signals to substantially eliminate all portions thereof lying in the range between said center frequency and one of said different band edge frequencies;

transmitting means; and means for continuously coupling the signals output from said second filter means to said transmitting means;

communication link means coupled to said transmitting means; and receiving station means coupled to said communication link means, said receiving station means including:

third filter means for selectively filtering signals received by said receiving station means to sharply attenuate any signal portions lying in said range;

second processing means coupled to said third filter means for generating second intermediate composite signals comprising a direct portion corresponding to the signals from said third filter means and an inverted portion corresponding to a frequency inversion of said signals from said third filter means about substantially said center frequency;

fourth filter means coupled to said second processing means for selectively attenuating those portions of said second intermediate composite signals lying adjacent to said band edge frequency associated with said first fractional bandwidth portion;

means coupled to said fourth filter means for amplifying those portions of said second intermediate composite signals lying predominantly in said second fractional bandwidth portion; and output terminal means coupled to said amplifying means for manifesting the signals output therefrom.

9. The combination of claim 8 wherein said first processing means includes means for generating a carrier signal having a predetermined frequency, and means for modulating said modified signals with said carrier signal.

10. The combination of claim 9 wherein said carrier signal has a frequency nf, where f is the band edge frequency associated with said first fractional bandwidth portion and n is a number lying in the range from about 0.9 to about 1.33

11. The combination of claim 10 wherein said carrier signal frequency is equal to said band edge frequency associated with said first fractional bandwidth portion.

12. The combination of claim 8 wherein said second processing means includes means for generating a carrier signal having a predetermined frequency, and means for modulating said filtered signals with said carrier signal.

13. The combination of claim 12 wherein said carrier signal has a frequency nf, where f is the band edge frequency associated with said first fractional bandwidth portion and n is a number lying in the range from about 0.9 to about 1.33.

14. The combination of claim 13 wherein said carrier signal frequency is equal to said band edge frequency associated with said first fractional bandwidth portion.

15. A method of transmitting information-bearing input signals from a sending station to a receiving station via a communication link having a predetermined system frequency bandwidth, said input signals having first portions lying predominantly within a first fractional portion of said system frequency bandwidth and second portions lying predominantly within a second fractional portion of said system frequency bandwidth, said first and second fractional bandwidth portions each having a different band edge frequency associated therewith, said first and second signal portions being substantially temporally spaced and said second fractional bandwidth portion lying outside said first fractional bandwidth portion, said method comprising the steps of:
(a) selectively attenuating those portions of said input signals lying adjacent the band edge frequency $f_u$ associated with said first fractional bandwidth portion to produce modified signals;
(b) processing said modified signals to produce first intermediate composite signals comprising first and second frequency translated compound portions, said first compound portion corresponding to said modified signals frequency translated forward said band edge frequency $f_u$ by a predetermined amount $f_0$, said second compound portions corresponding to an inversion of said modified signals frequency translated toward a band edge frequency $f_1$ associated with said second fractional bandwidth portion by a predetermined amount $f_u - f_0$ and folded back from said band edge frequency $f_1$ into the system frequency bandwidth;
(c) selectively filtering said first intermediate composite signals to substantially eliminate said first frequency translated compound portion;
(d) continuously coupling the signals resulting from step (c) to a transmitting device;
(e) transmitting the signals coupled to said transmitting device to said receiving station;
(f) selectively filtering the received signals to sharply attenuate any signal portions having a frequency no less than $f_O$;
(g) processing the resulting signals from step (f) to produce second intermediate composite signals comprising an uninverted portion corresponding to said resulting signals and an inverted portion corresponding to a frequency inversion of said resulting signals about $f_O$;
(h) selectively attenuating those portions of said second intermediate composite signals lying adjacent said band edge frequency $f_u$; and
(i) continuously coupling the signals resulting from step (h) to a receiver device.

16. The method of claim 15 wherein said step (b) includes the steps of generating a carrier signal having a frequency $f_u$ and modulating said modified signals with said carrier signal.

17. The method of claim 16 wherein said step (c) of selectively filtering includes the step of passing said modified signals through a band pass filter having a predetermined cutoff frequency $f_c$, and wherein said carrier signal frequency $f_O$ is in the range from about 1.2 to about $1.8 \times f_c$.

18. The method of claim 15 wherein said step (g) of processing includes the step of generating a carrier signal having a frequency $f_O$, and modulating said filtered signals with said carrier signal.

19. The combination of claim 18 wherein said step (f) of selectively filtering includes the step of passing said received signals through a band pass filter having a predetermined cutoff frequency $f_c$, and wherein said carrier signal frequency $f_O$ is in the range from about 1.2 to about $1.8 \times f_c$.

20. A communications system for transmitting information-bearing input signals from a first location to a second location via a communication link having a predetermined system frequency bandwidth, said input signals having first portions lying predominantly within a first fractional portion of said system frequency bandwidth and second portions lying predominantly within a second fractional portion of said system frequency bandwidth, said first and second fractional portions having a different band edge frequency $f_u$, $f_l$, respectively, associated therewith, said first and second signal portions being substantially temporally spaced and said second fractional bandwidth portion lying outside said first fractional bandwidth portion, said system comprising:
sending station means including:
input terminal means adapted to receive said input signals;
first filter means coupled to said input terminal means for selectively attenuating the first portions of said input signals lying adjacent the associated band edge frequency $f_u$ to produce modified signals;
first processing means coupled to said first filter means for generating first intermediate composite signals comprising first and second frequency translated compound portions, said first compound portion corresponding to said modified signals frequency translated toward said first band edge frequency $f_u$ by a predetermined amount $f_O$, the second compound portions corresponding to an inversion of said modified signals frequency translated toward said second band edge frequency $f_1$ by a predetermined amount $f_u - f_O$ and folded back from said second band edge frequency $f_l$ into said system frequency bandwidth;
second filter means coupled to said first processing means for selectively filtering said first intermediate composite signals to substantially eliminate said first frequency translated compound portion;
transmitting means; and
means for continuously coupling those signals appearing at the output of said second filter means to said transmitting means;
communication link means coupled to said transmitting means; and
receiving station means coupled to said communication link means for receiving the signals transmitted by said transmitting means, said receiving station means including:

third filter means for selectively filtering the received signals to sharply attenuate any signal portion having a frequency no less than $f_O$;

second processing means coupled to said third filter means for processing the signals from said third filter means to produce second intermediate composite signals comprising an uninverted portion corresponding to said signals from said third filter means and an inverted portion corresponding to a frequency inversion of said signals from said third filter means about $f_O$;

fourth filter means coupled to said second processing means for selectively attenuating those portions of said second intermediate composite signals lying adjacent said first band edge frequency $f_u$; and output terminal means coupled to said fourth filter means for manifesting the signals output therefrom.

21. The combination of claim 20 wherein said first processing means includes means for generating a carrier signal having a frequency $f_O$, and means for modulating said modified signals with said carrier signal.

22. The combination of claim 21 wherein said second filter means comprises a band pass filter having a predetermined cutoff frequency $f_c$, and wherein said carrier signal frequency $f_O$ is in the range from about $1.2\ f_c$ to about $1.8\ f_c$.

23. The combination of claim 22 wherein said carrier signal frequency $f_O$ is substantially equal to the $-50$ db attenuation frequency of said second filter means.

24. The combination of claim 20 wherein said second processing means includes means for generating a carrier signal having a frequency $f_O$, and means for modulating said filtered signals with said carrier signal.

25. The combination of claim 24 wherein said third filter means comprises a band pass filter having a predetermined cutoff frequency $f_c$, and wherein said carrier signal frequency $f_O$ is in the range from about $1.2\ f_c$ to about $1.8\ f_c$.

26. The combination of claim 25 wherein said carrier signal frequency $f_O$ is substantially equal to the $-50$ db attenuation frequency of said third filter means.

27. A signal processing apparatus for reducing the frequency bandwidth of input signals to be transmitted from a sending station to a receiving station via a communication link having a preselected system frequency bandwidth, said input signals having first portions lying predominantly within a first fractional portion of said system frequency bandwidth and second portions lying predominantly within a second fractional portion of said system frequency bandwidth, said first and second fractional bandwidth portions each having a different band edge frequency associated therewith, said first and second signal portions being substantially temporally spaced and said second fractional bandwidth portion lying outside said first fractional bandwidth portion, said apparatus comprising:

input terminal means adapted to receive said input signal;

first filter means coupled to said input terminal means for selectively attenuating said first portions of said input signals lying adjacent the band edge frequency associated with said first fractional bandwidth portion to produce modified signals;

output terminal means adapted to be coupled to a transmitter;

processing means coupled to said first filter means for generating intermediate composite signals comprising an uninverted portion corresponding to the modified signals and an inverted portion corresponding to a frequency inversion of said modified signals about substantially the center frequency of said system frequency bandwidth;

second means for selectively filtering said intermediate composite signals to substantially eliminate all portions thereof lying in the range between said center frequency and one of said different band edge frequencies; and means for continuously coupling the signals output from said second filter means to said output terminal means.

28. The combination of claim 27 wherein said processing means includes means for generating a carrier signal having a predetermined frequency, and means for modulating said modified signals with said carrier signal.

29. The combination of claim 28 wherein said carrier signal has a frequency lying in the range from about 0.9 to about 1.33 times the band edge frequency associated with said first fractional bandwidth portion.

30. The combination of claim 29 wherein said carrier signal frequency is equal to said band edge frequency associated with said first fractional bandwidth portion.

31. A signal processing apparatus for expanding compressed information signals derived from original input signals at a sending station and received over a communication link having a preselected system frequency bandwidth, said original input signals having first portions lying predominantly within a first fractional portion of said system frequency bandwidth and second portions lying predominantly within a second fractional portion of said system frequency bandwidth, said first and second fractional bandwidth portions each having a different band edge frequency associated therewith, said first and second signal portions being substantially temporally spaced and said second fractional bandwidth portion lying outside said first fractional bandwidth portion, said compressed information signals having frequency spectrum components lying predominantly within the second fractional portion of said system frequency bandwidth and containing equivalent information to that contained in said first and second portions of said original input signals, said apparatus comprising:

first filter means for selectively filtering said compressed signals to sharply attenuate any signal portions lying in the range between the center frequency of said system frequency bandwidth and one of said different band edge frequencies;

processing means coupled to said first filter means for generating intermediate composite signals comprising a direct portion corresponding to said signals from said first filter means and an inverted portion corresponding to a frequency inversion of said signals from said first filter means about substantially said center frequency;

second filter means coupled to said processing means for selectively attenuating those portions of said intermediate composite signals lying adjacent said band edge frequency associated with said first fractional bandwidth portion;

means coupled to said second filter means for amplifying those portions of said intermediate composite signals lying predominantly within said second fractional bandwidth portion; and output terminal means coupled to said amplifying means for manifesting the signals output therefrom.

32. The combination of claim 31 wherein said processing means includes means for generating a carrier signal having a predetermined frequency, and means for modulating said filtered signals with said carrier signal.

33. The combination of claim 32 wherein said carrier signal has a frequency lying in the range from about 0.9 to about 1.33 times said band edge frequency associated with said first fractional bandwidth portion.

34. The combination of claim 33 wherein said carrier signal frequency is equal to said band edge frequency associated with said first fractional bandwidth portion.

35. A signal processing apparatus for reducing the frequency bandwidth of input signals to be transmitted from a first location to a second location via a communication link having a predetermined system frequency bandwidth, said input signals having first portions lying predominantly within a first fractional portion of said system frequency bandwidth and second portions lying predominantly within a second fractional portion of said system frequency bandwidth, said first and second fractional portions having a different band edge frequency $f_u$, $f_l$, respectively, associated therewith, said first and second signal portions being substantially temporally spaced and said second fractional bandwidth portions lying outside said first fractional bandwidth portion, said apparatus comprising:

input terminal means adapted to receive said input signals;

first filter means coupled to said input terminal means for selectively attenuating the first portions of said input signals lying adjacent the associated band edge frequency $f_u$ to produce modified signals;

processing means coupled to said first filter means for generating intermediate composite signals comprising first and second frequency translated compound portions, said first compound portion corresponding to said modified signals frequency translated toward said first band edge frequency $f_u$ by a predetermined amout $f_O$, the second compound portions corresponding to an inversion of said modified signals frequency translated toward said second band edge frequency $f_l$ by a predetermined amount $f_u - f_O$ and folded back from said second band edge frequency $f_l$ into said system frequency bandwidth;

second filter means coupled to said first processing means for selectively filtering said intermediate composite signals to substantially eliminate said first frequency translated compound portion; and output terminal means adapted to be coupled to a transmitter.

36. The combination of claim 35 wherein said processing means includes means for generating a carrier signal having a frequency $f_O$, and means for modulating said modified signals with said carrier signal.

37. The combination of claim 36 wherein said second filter means comprises a bandpass filter having a predetermined cutoff frequency $f_c$, and wherein said carrier signal frequency $f_O$ is in the range from about 1.2 $f_c$ to about 1.8 $f_c$.

38. The combination of claim 37 wherein said carrier signal frequency $f_O$ is substantially equal to the $-50$ db attenuation frequency of said second filter means.

39. A signal processing apparatus for expanding compressed information signals derived from original input signals at a sending station and received over a communication link having a preselected system frequency bandwidth, said original input signals having first portions lying predominantly within a first fractional portion of said system frequency bandwidth and second portions lying predominantly within a second fractional portion of said system frequency bandwidth, said first and second fractional portions having a different band edge frequency $f_u$, $f_l$, respectively, associated therewith, said first and second signal portions being substantially temporally spaced and said second fractional bandwidth portion lying outside said first fractional bandwidth portion, said compressed information signals having frequency spectrum components lying predominantly within the second fractional portion of said system frequency bandwidth and containing equivalent information to that contained in said first and second portions of said original input signals, said apparatus comprising:

first filter means for selectively filtering said compressed signals to sharply attenuate any signal portion having a frequency no less than a predetermined frequency $f_O$;

processing means coupled to said first filter means for processing the signals from said first filter means to produce intermediate composite signals comprising an uninverted portion corresponding to said signals from said first filter means and an inverted portion corresponding to a frequency inversion of said signals from said first filter means about $f_O$;

second filter means coupled to said processing means for selectively attenuating those portions of said intermediate composite signals lying adjacent said first band edge frequency $f_u$; and output terminal means coupled to said second filter means for manifesting the signals output therefrom.

40. The combination of claim 39 wherein said processing means includes means for generating a carrier signal having a frequency $f_O$, and means for modulating said filtered signals with said carrier signal.

41. The combination of claim 40 wherein said second filter means comprises a band pass filter having a predetermined cutoff frequency $f_c$, and wherein said carrier signal frequency $f_O$ is in the range from about 1.2 $f_c$ to about 1.8 $f_c$.

42. The combination of claim 41 wherein said carrier signal frequency $f_O$ is substantially equal to the $-50$ db attenuation frequency of said first filter means.

* * * * *